(No Model.) 4 Sheets—Sheet 1.
J. B. FAISANT.
SWIVEL LOOM.
No. 467,321. Patented Jan. 19, 1892.
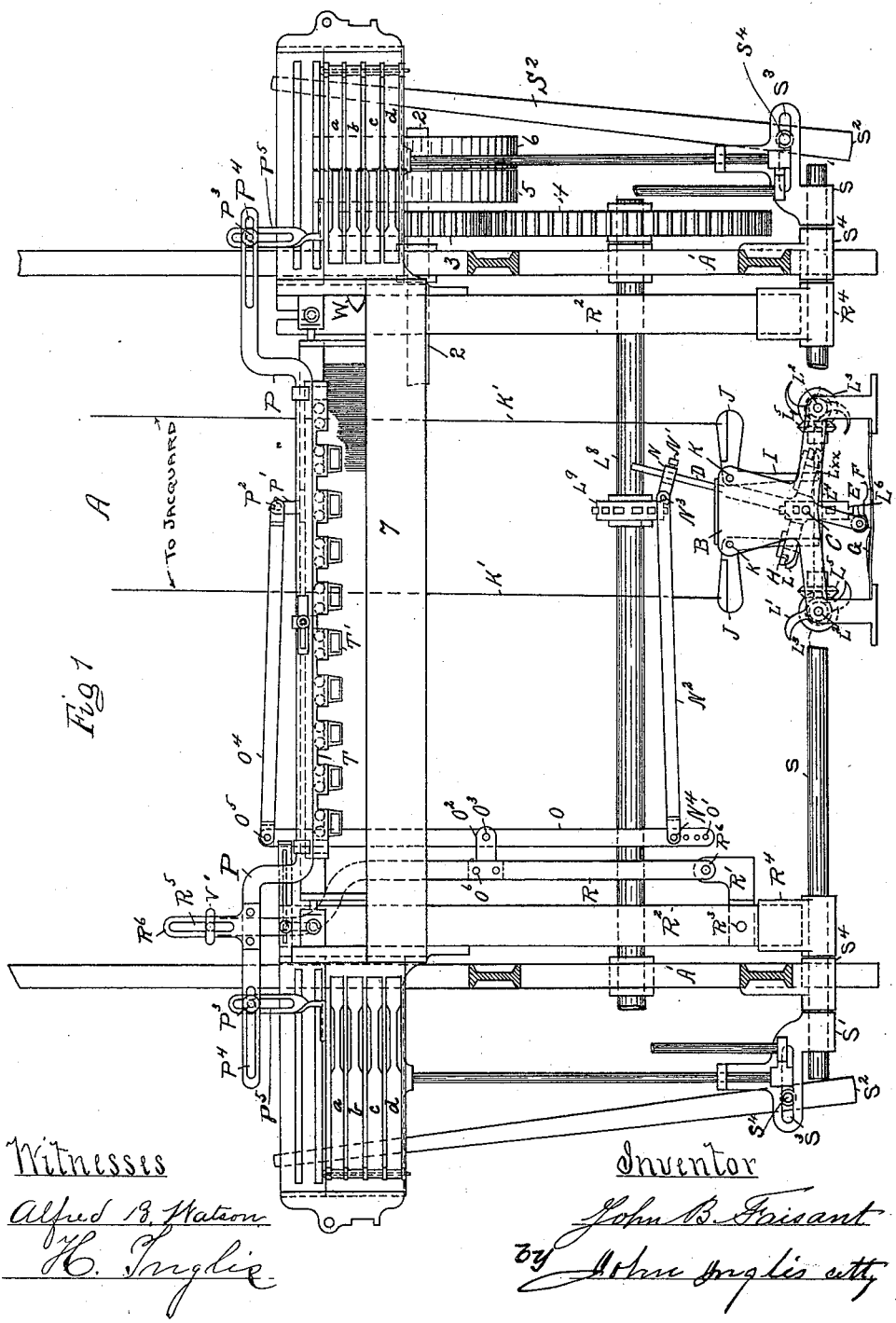
Witnesses
Alfred B. Watson
H. Inglis
Inventor
John B. Faisant
By John Inglis atty

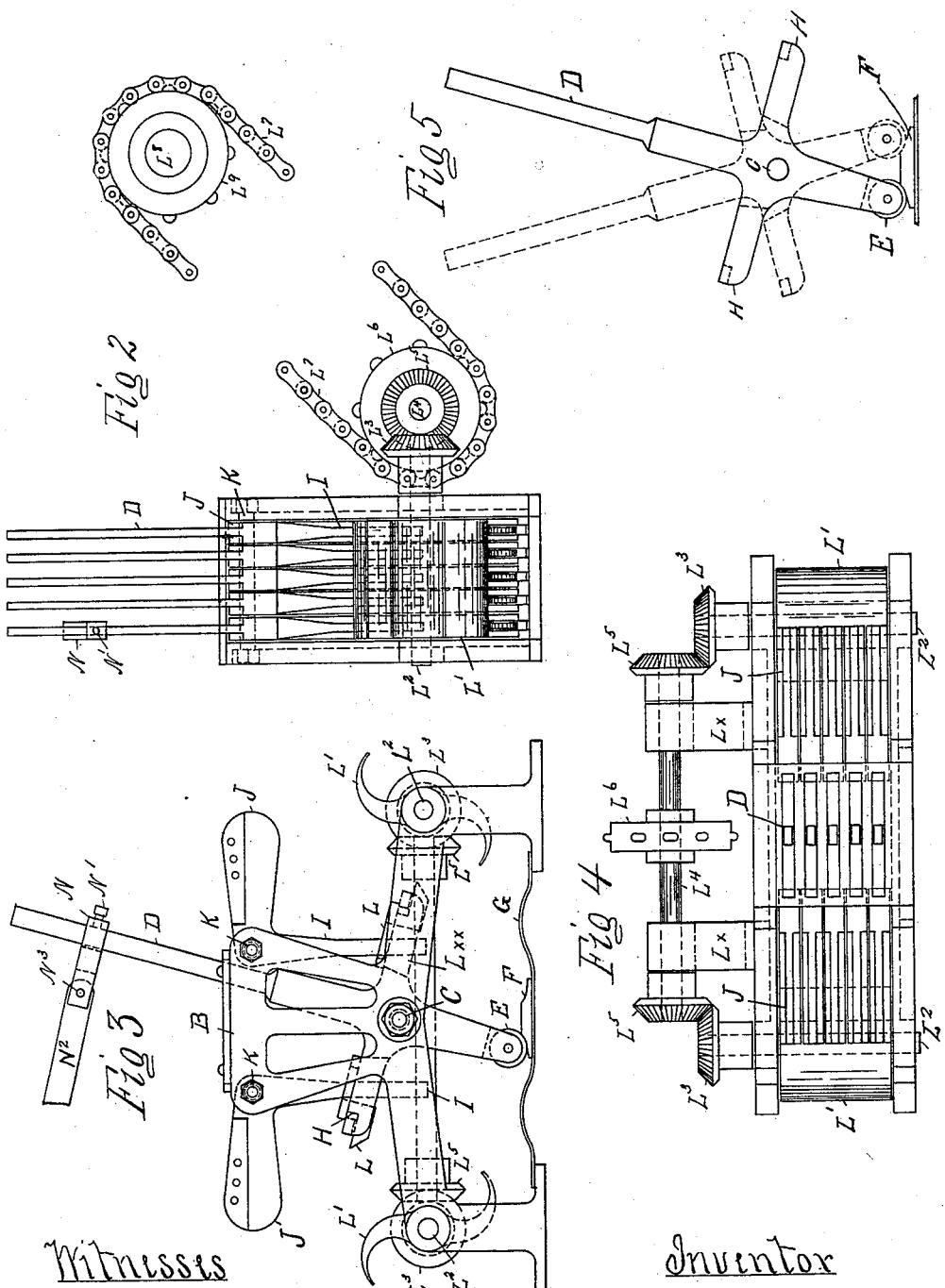

(No Model.) 4 Sheets—Sheet 3.
J. B. FAISANT.
SWIVEL LOOM.
No. 467,321. Patented Jan. 19, 1892.
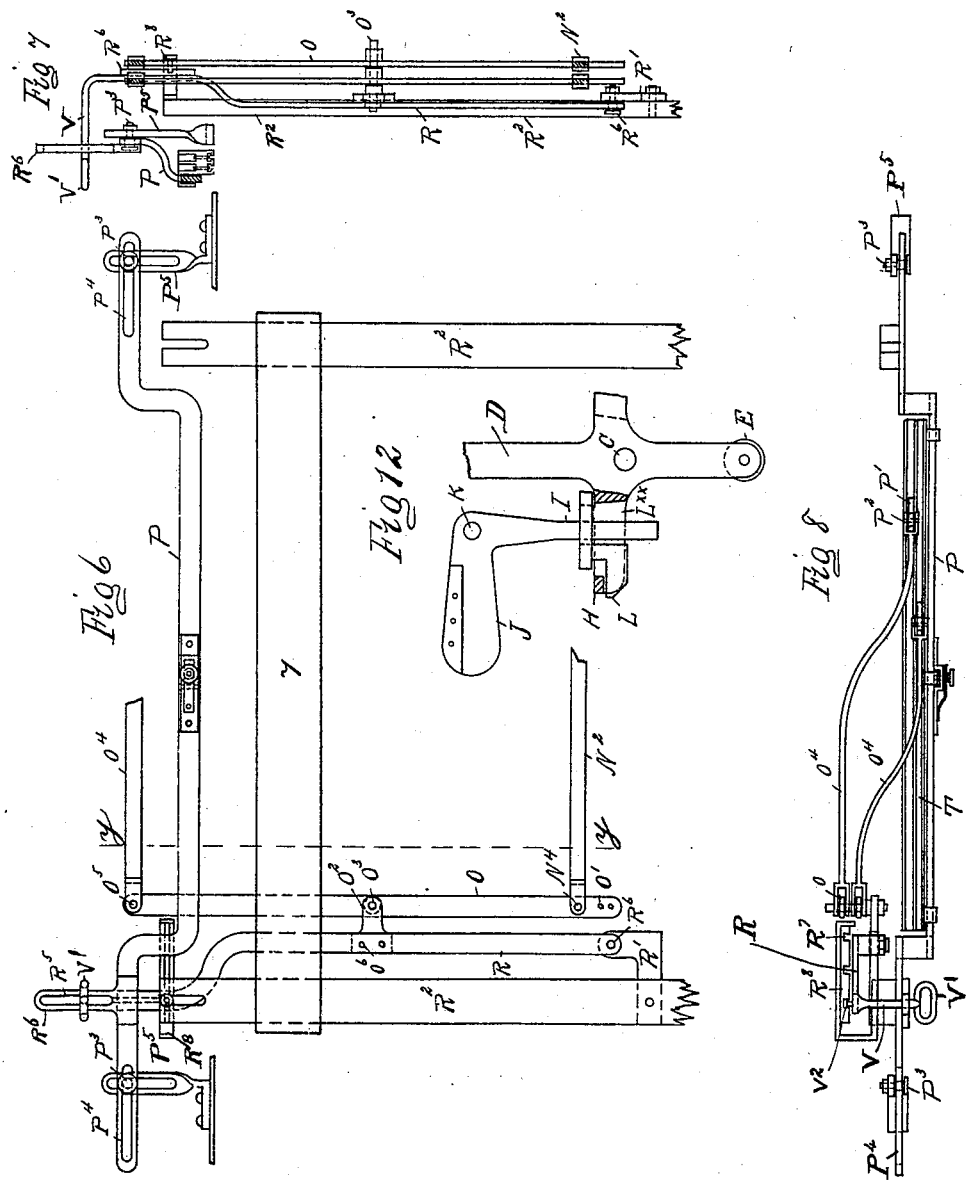
Witnesses
Alfred B Watson
J. H. Inglis
Inventor
John B. Faisant
by John Inglis atty (No Model.) 4 Sheets—Sheet 4.
J. B. FAISANT.
SWIVEL LOOM.
No. 467,321. Patented Jan. 19, 1892.
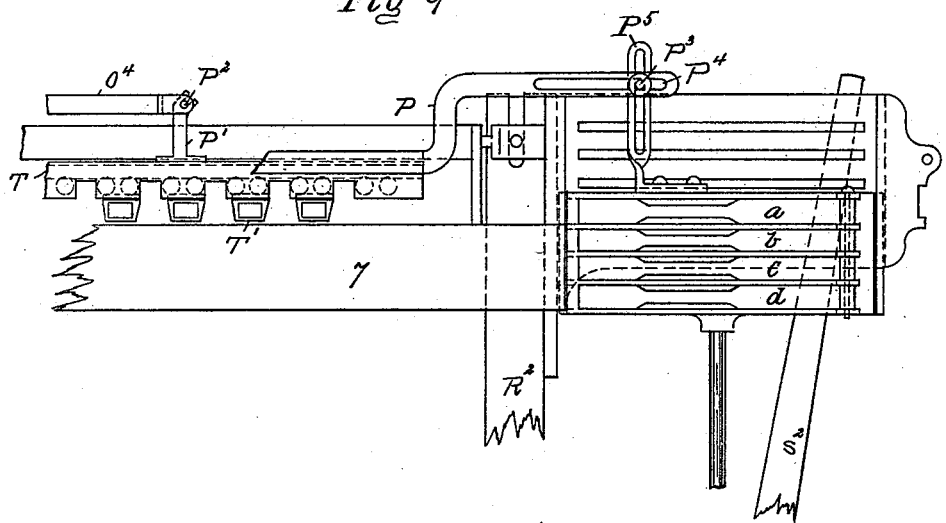
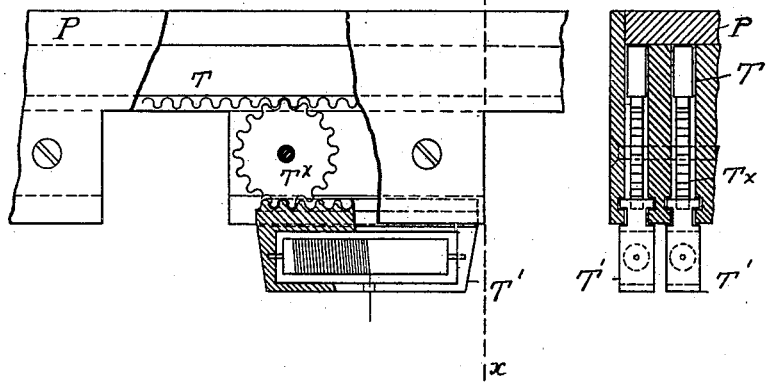
Witnesses
Alfred B Watson
H. Inglis
Inventor
John B. Faisant
by John Inglis atty

UNITED STATES PATENT OFFICE.

JOHN B. FAISANT, OF PATERSON, NEW JERSEY.

SWIVEL-LOOM.

SPECIFICATION forming part of Letters Patent No. 467,321, dated January 19, 1892.

Application filed January 30, 1891. Serial No. 379,694. (No model.)

*To all whom it may concern:*

Be it known that I, JOHN B. FAISANT, a citizen of the United States, residing at Paterson, in the county of Passaic and State of New Jersey, have invented certain new and useful Improvements in Swivel-Looms, of which the following is a specification.

This invention relates to looms for swivel-weaving; and it consists in the novel construction and combination of the parts hereinafter fully described and claimed, whereby the ordinary fly-shuttle may be used alternately, as hereinafter more fully described, in conjunction with swivel-shuttles to produce a figured fabric.

In the drawings, Figure 1 is a front view of the principal parts of the loom, showing the fly-shuttle in a position to be operated and the swivel-shuttles and their operating mechanism, portions of the frame being in section in this figure. Fig. 2 is a detail end view of the levers J and levers D and their driving mechanism. Figs. 3 and 4 are respectively a side and a plan view of the arms and levers shown in Fig. 2. Fig. 5 is a detail front view of a lever D, showing the same in two positions. Fig. 6 is a detail front view of the levers R and O and the swivel-shuttle-supporting bar P and their connections, the same as shown in Fig. 1, various other parts being omitted for clearness. Figs. 7 and 8 are respectively a side and a plan view of the parts shown in Fig. 6. Fig. 9 is a detail front view of one end of the lay, showing the swivel-shuttles in position to be operated. Fig. 10 is a front view, partly in section, of a portion of the rack-frame P and the rack mechanism. Fig. 11 is a sectional end view of the parts shown in Fig. 10, taken on line $x\,x$ in Fig. 10. Fig. 12 is a detail view of a part of one of the levers D, partly in section, and one of the levers J.

A in Fig. 1 represents a drop-shuttle-box loom adapted for plain weaving and swivel-weaving.

B is a frame under the loom, and D are levers provided with arms H and pivoted on the shaft C, which is supported by the frame B.

The arms H have slots $L^{xx}$, as shown in Fig. 12, and L are slides consisting of plates above and below the arms, the upper of the said plates being provided with holes for the arms I to pass through and being connected to the lower plates by stems, which pass through the slots, and which slides are free to move in the said slots. The lower end of each lever D carries a wheel E, and F is a seat with which the said wheel engages.

G is a spring secured to the frame B and adapted to support the seat F and press it against the wheel E, so that the lever is steadied or held in position when moved and may only be moved back and forth on its shaft by using a certain amount of force sufficient to overcome the resistance of the spring G.

J are bell-crank levers pivoted on the pins K, projecting through the sides of the frame B over the arms H. These levers J have arms I, which pass through the said slides L, as shown in Fig. 12. The other arms of the levers J are connected by the cords K' with the Jacquard mechanism, which is of ordinary approved construction and is not shown in the drawings, as it does not form a part of the present invention.

When a cord K' is pulled upward, the slide L is moved outward by the arm I into the path of the revolving cam L', Fig. 3, and the said cam raises the arm H and throws over the lever D, to which the said arm is connected. When the cam leaves the slide, the lever J falls back into its original position by gravity and moves the slide out of the path of the cam until the opposite slide L has been acted on by the like cam at the other side of the frame. The levers D are thus moved back and forth by the levers J when swivel-weaving is being carried on, and these levers D are operatively connected with the swivel-shuttles, as will be more fully described hereinafter. The cams L' are mounted on the shafts $L^2$, which have beveled toothed wheels $L^3$, secured on their ends, Figs. 1, 2, and 4, and the said wheels are driven by the beveled toothed wheels $L^5$, secured on the shaft $L^4$, which is journaled in the bearings $L^x$ in the frame B. Motion is imparted to the shaft $L^4$ by means of the chain-wheel $L^6$ thereon, the drive-chain $L^7$, and the chain-wheel $L^9$, the latter being secured on the picking-shaft $L^8$, which is journaled in the loom-frame A', as shown in Fig. 2.

Each lever D has a slide N secured to it by a set-screw N', Fig. 3, and a rod N² is pivotally connected to each slide N by a pin N³. The slides N may be moved up or down on the levers D to adjust and vary the strokes of the rods N². The other end of each rod N² is pivotally connected to the lower end of a lever O by a pin N⁴ in one of the holes O', provided for adjustment, as shown in Figs. 1 and 6. Each lever O is arranged vertically, and is pivoted to the bracket O² by the pin O³, and the upper end of each lever O is pivoted to a rod O⁴ by a pin O⁵. The rod O⁴ is connected to the swivel-shuttle rack T by means of the bracket P' and the pivot-pin P². The supporting-bar P is provided with swivel-shuttles T', which are actuated by the levers D through the intermediate connecting mechanism just described, the rack T, and the pinions T$^x$. The bracket O², to which the lever O is pivoted, is secured by bolts O⁶ to the lever R, Fig. 6, and the lever R is pivoted at its lower end to the bracket R' by the pin R⁶. The bracket R' is secured to the left-hand lay-sword R². The lever R is provided with a horizontal rod V at its upper end, which rod terminates in a handle V', and this rod passes through a vertical slot R⁵, secured to the swivel-shuttle-supporting bar P. The slot R⁵ permits the swivel-shuttle-supporting bar to be raised and lowered without moving the rod V. The ends of the swivel-shuttle-supporting bar P have horizontal slots P⁴ and bolts P³, adjustably fixed in the slotted brackets P⁵, so that when moved to change the relative location of the swivel-shuttles the bar P slides on the said bolts. These bolts P³ connect the said ends of the bar P to the vertically-slotted brackets P⁵, secured to the top of the fly-shuttle boxes $a\ b\ c\ d$ at each end of the lay. The rod V is provided with a locking-pin V², which enters the notches R⁷ in the locking-plate R⁸, as shown in Fig. 8, and the locking-plate is secured to the rear of the lay-sword R². The rod V may be moved horizontally to adjust the position of the frame P, together with the swivel-shuttle frame and swivel-shuttles.

The swivel-shuttle-supporting bar or frame P and the parts carried by it can be quickly moved to the right in Fig. 1 by means of the rod V, the locking-pin being placed in another notch in the locking-plate. This movement of the frame or bar P changes the position of the figure in the fabric, the locking-notches being arranged at certain distances apart, so that the swivel-shuttles may have the requisite movement.

The lay-swords R² are connected to the lay rock-shaft S by the boxes R⁴, as shown in Fig. 1. Each picker-stick S² is supported upon a stud S⁴, adjustably secured in a slot S³ in the bracket S', which is mounted on the said rock-shaft in the usual manner.

The driving-shaft 2 is provided with a fast driving-pulley 5 and a loose pulley 6 and has a toothed wheel 3 secured on it, which gears into a toothed wheel 4, secured on the end of the shaft L⁸, and the picker-sticks are operated from the latter shaft continuously by the usual connections. The driving-shaft 2 also vibrates the lay 7 in the usual manner and by means of the usual cranks and pitmen.

The fly-shuttle boxes are raised and lowered by any approved devices for that purpose—as, for instance, the devices described and shown in the patent to L. J. Knowles, No. 134,992, dated January 21, 1873.

The swivel-shuttles are raised and lowered by the same devices which raise and lower the fly-shuttle boxes, the bar P, carrying said swivel-shuttles, being supported by the brackets P⁵, secured to the tops of the said boxes.

Plain and swivel weaving are carried on in the loom in the following manner: Referring now to Fig. 1, the fly-shuttle W is thrown back and forth by the picker-sticks S² through the shed and performs the operation of plain weaving. As the weaving proceeds and a figure is required the boxes $a\ b\ c\ d$ and the swivel-rack are lowered to the position shown in Fig. 9. The top box $a$ at each end of the lay is vacant, so that the fly-shuttle may rest, and consequently not be thrown, while the swivel-shuttles are operating. The Jacquard mechanism pulls a cord K' and lifts a lever J and throws the slide L, connected therewith, into the path of the revolving cam L'. The cam then lifts the arm H and throws over the lever D, and the lever D carries with it the lower end of the lever O. The lever O then moves the swivel-shuttle rack T to one side, and, through the pinions T$^x$, the shuttles T' to the other side through the shed and throws in the weft to form the desired figure. The lever J then falls by gravity and the slide is moved out of the path of the cam, as hereinbefore described. The levers D are moved from side to side in the order determined by the Jacquard mechanism to cause the swivel-shuttles to form any desired pattern, and the levers D are held in their opposite positions and are steadied by the spring-pressed seats F. The picker-sticks and the shaft L⁸ are in constant motion, and the cams L' also revolve constantly while the loom is in operation. The devices for plain weaving and swivel-weaving may be actuated alternately by raising and lowering the boxes $a\ b\ c\ d$ at each pick of the loom and arranging the picks of the fly and swivel shuttles accordingly, or the fly-shuttles may be made to throw in any desired number of picks at one time. A separate lever D and its system of connecting devices is provided for each color of weft used; but all the levers D are operated by the same cams. The number of swivel-shuttle racks T, pinions T$^x$, and shuttles T' is also in accordance with the number of colors of weft used.

What I claim is—

1. In a loom, the combination, with the loom-frame, the swivel-shuttle-supporting bar P, the pinions carried thereby, and the rack for actuating the swivel-shuttles, of the pivoted levers J, having the arms I and adapted to be operated by the Jacquard mechanism, the pivoted levers D, provided with slotted arms H and wheels E, connections between the said levers D and the actuating-rack for the swivel-shuttles, slides in the arms H, with which the arms I engage, revoluble cams adapted to strike the said slides when the said slides are by the operation of the levers J brought into the path of movement of the said cams, the spring-pressed seat F, adapted to bear against the wheels E, and means for rotating the cams, substantially as described.

2. In a loom, the combination, with the pivoted levers J, having arms I and adapted to be operated by the Jacquard mechanism, of the pivoted levers D, provided with slotted arms H, the slides in the arms H for the arms I to engage with, the cams adapted to strike the said slides when the slides are moved into the paths of the cams, the wheels E, carried by the levers D, the spring-actuated seats F, engaging with the said wheels, the cam-shafts, the beveled toothed wheels secured on the cam-shafts, the cross-shaft provided with a chain-wheel and beveled toothed wheels for driving the cams, a driving-shaft also provided with a chain-wheel, and a drive-chain connecting the said chain-wheels, whereby the said cams may be revolved continuously, substantially as and for the purpose set forth.

3. In a loom, the combination, with the swivel-shuttle-supporting bar P, provided with a bracket having a vertical slot $R^5$, of the lay, the lever R, having its lower end pivoted to one of the lay-swords and provided with a rod V at its upper end engaging with the said slot, a bracket secured to the lever R, the vertical oscillatory levers O, centrally pivoted to the said bracket, the swivel-shuttle rack T, pinions $T^x$, levers D, means for operating levers D, substantially as described, and the rods $N^2$ and $O^4$, connecting the levers O with the levers D and with the said rack T, and a locking-plate provided with notches for the end of the said rod V to engage with, whereby the position of the said bar P may be varied, substantially as and for the purpose set forth.

JOHN B. FAISANT.

Witnesses:
JOHN INGLIS,
H. INGLIS.